June 3, 1952  J. J. STEINMETZ  2,598,727

HUMIDITY CONTROLLING HYGROMETER

Filed April 29, 1946

INVENTOR.
JOSEPH J. STEINMETZ
BY
*M. Hayes*
ATTORNEY

Patented June 3, 1952

2,598,727

UNITED STATES PATENT OFFICE 2,598,727

HUMIDITY CONTROLLING HYGROMETER

Joseph J. Steinmetz, Merrick, N. Y.

Application April 29, 1946, Serial No. 665,714

2 Claims. (Cl. 73—337)

(Granted under the act of March 3, 1883, as amended April 30, 1928; 370 O. G. 757)

The invention described herein may be manufactured and used by or for the Government of the United States of America for governmental purposes without the payment of any royalties thereon or therefor.

This invention relates to humidity measuring devices, and comprises a novel hygrometer. The disclosed embodiment of the invention is particularly constructed to control atmospheric humidity.

An object of this invention is to provide a direct-reading instrument for the measurement of relative humidity.

Another object of this invention is to provide an apparatus for automatic control of humidity.

Further objects and advantages of this invention, as well as its construction, arrangement and operation, will be apparent from the following description and claims in connection with the accompanying drawing, in which:

Figure 1:
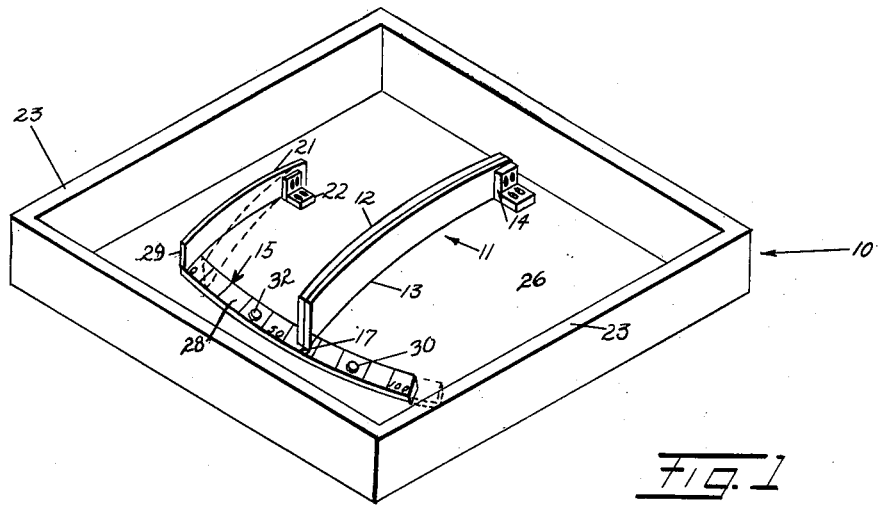
Fig. 1 is perspective of one form of the invention.
Figure 2:
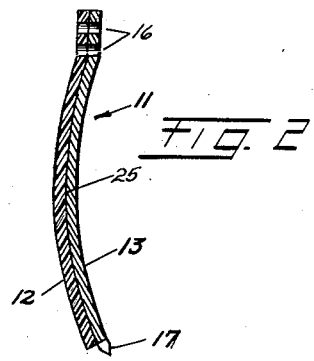
Fig. 2 is a detail of the instrument in Fig. 1, in longitudinal cross-section.

The instrument shown in Fig. 1, generally designated as 10, is a hygrometer comprising a pointer 11, which consists of a moisture-absorbent strip 12 and a non-moisture absorbent strip 13, both strips being flexible. The strips 12 and 13 are positioned side-by-side, and are bonded together along their adjacent contacting faces 25, as seen in Fig. 2, by means of cement, rivets or other suitable means. Rivet holes 16, Fig. 2, are provided at one end of the pointer 11 by means of which it is secured or fastened to a support or bracket 14 which is carried by the base 26, Fig. 1. The other end 17 of pointer 11 is free to move. The base 26 may be provided with the side walls or frame 23, thus constituting a container for the instrument constituting hygrometer 10.

Changes in conditions of atmospheric humidity will cause the pointer 11 to flex, and the free end 17 of the pointer will thereby move along a predetermined path. The scale 15 is positioned to extend along and adjacent to the path of the pointer end 17. The scale 15 is rigid and is provided with indicia 28, preferably in terms of relative humidity, which indicate the existing condition of atmospheric humidity according to the position of the pointer end 17 along the scale 15.

The two strips 12 and 13 comprising the pointer 11 may be of any two materials with appreciably different hygroscopic properties. The strip 12 is sufficiently moisture-absorbent that it expands or contracts with change in humidity. Strip 13 is preferably completely non-moisture-absorbent. Both strips 12 and 13 are flexible and have sufficient strength for use in a pointer of this type. The moisture-absorbent material of strip 12 may be selected from hydrophilic materials such as hydrophilic cellulosic materials, hydrophilic resins, and the like, including such compounds as regenerated cellulose, cellulose esters, cellulose ethers and synthetic hydrophilic resins.

Cellulose acetate is used in the disclosed embodiment of the invention and is a moisture absorbent or hygroscopic material that expands with an increase in humidity. Metal is impervious to moisture and is non-absorbent, and therefore does not expand or contract with change in humidity. Stresses set up in strip 12 of cellulose acetate by its absorption or yielding of moisture, because it is bonded to the metal strip 13 that is non-absorbent cause the pointer 11 to bend or flex so that the free end 17 of pointer 11 moves along the scale 15.

The bracket 22 is carried by the base 26, and is secured to one end of a thermo-responsive bimetallic strip 21 of well-known structure, which bends under temperature change. The end 29 of the bimetallic strip 21 remote from the bracket 22 is free to move under flexure of the strip in response to atmospheric temperature changes. The scale 15 is secured to the bimetallic strip 21 at the free end 29 thereof in position to project laterally away from the strip. The scale 15 is thereby moved as indicated in dotted lines along the path of pointer end 17 when the bimetallic strip 21 flexes in response to temperature change, the supporting brackets 22 and 24 of the strip 21 and pointer 11 respectively being accordingly positioned with reference to each on the base 26.

The scale 15 of instrument 10 is calibrated. Calibration may be accomplished by means of any suitable hygrometer, of the wet-and-dry-bulb variety for example, and the indicia 28 are located on the scale 15 in accordance with its calibration.

The hygrometer 10 may be used to indicate the current condition of atmospheric humidity where the hygrometer is located, or it may be used for the control of conditions of atmospheric humidity in a room, chamber or the like enclosure.

Electrical terminal 30 is secured to the scale 15 at a point along its indicia 28 corresponding with the condition of maximum atmospheric humidity desired in the room. The pointer 11 is provided with a suitable electric contact located along the pointer in position to intersect and engage the terminal 30 when atmospheric humidity has increased to the desired maximum and has caused the pointer 11 to be flexed a corresponding magnitude. In the disclosed embodiment, the terminal 30 is positioned in the path of the end 17 of pointer 11, which constitutes the tip of the metallic strip 13 as illustrated in Fig. 2, and which therefore constitutes a suitable electrical contact.

Figure 3:
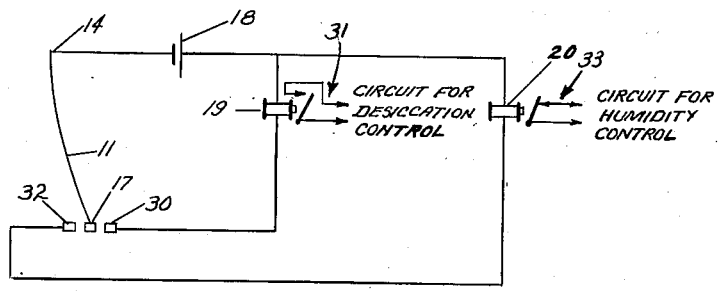
Fig. 3 represents a schematic wiring diagram of the instrument shown in Fig. 1, when used to activate humidity control apparatus.

The metal strip 13 of the pointer 11 is an electrical conductor, and is connected in line with the battery 18, Fig. 3, or other suitable source of electrical energy, terminal 30 of scale 15 also being in the circuit. When the circuit is closed between the terminal 30 and contact 17, the circuit of line 31 is closed, for example by means of relay 19. The line 31 is provided to operate a desiccator or other suitable apparatus for extracting moisture from the atmosphere when the circuit of the line is closed. The desiccator or other de-humidifying apparatus of line 31 may be conventional, and forms no part of the present invention. Therefore the de-humidifying apparatus is not disclosed herein.

The hygrometer 10 may be operated to control the conditions of atmospheric humidity in a chamber, and to hold the atmospheric humidity to a norm, i. e. within the limit of a maximum beyond which atmospheric humidity may be undesirable for any of a number of possible reasons. The terminal 30 is located along the scale 15 at the indicia 28 of the maximum desired relative humidity, or slightly below to allow for lag of operation of the hygrometer 10 and the de-humidifying apparatus of line 31. Whenever the atmospheric humidity approaches a magnitude at or near the desired maximum, as determined by the position of terminal 30 along the scale 15, the contact 17 engages the terminal 30 and closes the electrical circuit of battery 18, which operates the relay 19 to close the circuit 31 and operate the de-humidifier. Moisture is thereby extracted from the atmosphere, and this continues until the pointer 11 flexes sufficiently to move the contact 17 out of engagement with and away from terminal 30 in the direction downwardly of scale 15 along the indicia 28. The relay 19 then operates to open the circuit 31, and the dehumidifier is thereby put out of operation.

Although the humidity-control of hygrometer 10 has been described above for lowering the atmospheric humidity, hygrometer 10 may be constructed also to raise the atmospheric humidity. The terminal 32 is positioned along the scale 15 at or near the indicia 28 corresponding with the lowest relative humidity desired in the atmosphere. Deflection of pointer 11 by atmospheric humidity becoming reduced moves contact 17 to intersect and engage the terminal 32, which is in circuit with the relay 20, the relay 20 being in circuit with the battery 18 or other source of electrical energy and parallel with relay 19. Any suitable air conditioning apparatus, which may be conventional and is not shown because it forms no part of the present invention, is operated by line 33, which is under control of relay 20 when the circuit is closed between terminal 32 and contact 17.

Thus, when the atmosphere within the chamber in which the hygrometer 10 is located approaches a condition of relative humidity that is undesirably low, the contact 17 intersects and engages the terminal 32, which is located correspondingly along the scale 15. The relay 20 is thereby energized to change the electrical characteristics of circuit 33 in a manner for the air moistening apparatus of circuit 33 to operate. Moisture is thereby added to the atmosphere in the chamber, and the relative humidity of the atmosphere is raised thereby. The pointer 11 flexes in the direction upwardly of scale 15 along indicia 28 until the contact 17 moves out of engagement with terminal 33. The addition of moisture to the atmosphere is thus discontinued.

Increment deflections of the pointer 11 for a given quantum change of relative humidity are different at different temperatures. These differences in increment deflection of the pointer 11 are slight in an atmosphere where the temperature is controlled uniformly, but in atmosphere where the temperature is not uniform the readings on a rigid scale in fixed position may deviate from accuracy to an appreciable extent. Even in a building that is heated in the winter to maintain approximately uniform temperature, excessively erroneous readings of a rigid scale in fixed position may occur, particularly in the summer time when unusually high temperatures may occur more or less frequently.

By the rigid scale 15 being mounted on the bimetallic strip 21, to be moved thereby in response to temperature changes, the indicia 28 are moved to compensate for variations of increment deflection of the pointer 11 at different temperatures. Temperature-responsive movement of scale 15 is along the path of pointer end 17. This compensation of readings by movement of scale 15 in response to temperature changes makes the readings of scale 15 more accurate over a greater range of temperatures. The humidity measurements of hygrometer 10 are sufficiently accurate for most purposes throughout the range of atmospheric temperatures that are normal and within the range of temperatures encountered throughout the four seasons of a year inside a building.

It is to be understood that various modifications and changes may be made in this invention without departing from the spirit and scope thereof as set forth in the appended claims.

What is claimed is:

1. An instrument comprising a base, a pointer comprising two strips of material with respectively different hygroscopic properties, the strips being positioned side-by-side and bonded to each other along their adjacent contacting faces, the pointer being secured to the base at one of its ends, the other end of the pointer being free to move by flexure of the pointer responsive to changes in conditions of atmospheric humidity, a rigid scale positioned to extend along and adjacent to the path of the free end of the pointer, a thermo-responsive bimetallic strip, the scale being secured to one end of the bimetallic strip projecting laterally away therefrom, the other end of the bimetallic strip being secured to the base in position to hold the scale located along the path of the free end of the pointer, the end of the bimetallic strip to which the scale is attached being free to move by flexure of the bimetallic strip responsive to temperature changes, the scale being calibrated according to the position of the pointer along the scale at different relative humidities of the atmosphere.

2. In an instrument as defined in claim 1, the material of one of the strips of the pointer comprising a hydrophilic cellulose composition, the material of the other strip of the pointer being impervious to moisture.

JOSEPH J. STEINMETZ.

REFERENCES CITED

The following references are of record in the file of this patent:

UNITED STATES PATENTS

| Number | Name | Date |
|---|---|---|
| 1,060,786 | Perkett | May 6, 1913 |
| 1,174,188 | Smith | Mar. 7, 1916 |
| 1,282,763 | Curry | Oct. 29, 1918 |
| 1,958,813 | Bristol | May 15, 1934 |
| 2,019,886 | Bogoslowsky | Nov. 5, 1935 |
| 2,051,246 | Goss | Aug. 18, 1936 |
| 2,411,041 | Kahn | Nov. 12, 1946 |

FOREIGN PATENTS

| Number | Country | Date |
|---|---|---|
| 307,402 | Germany | June 22, 1917 |